United States Patent
Schneider et al.

(10) Patent No.: US 12,115,677 B2
(45) Date of Patent: Oct. 15, 2024

(54) ITEM PERTURBATION FOR PICKING OPERATIONS

(71) Applicant: RightHand Robotics, Inc., Somerville, MA (US)

(72) Inventors: Franz Schneider, Somerville, MA (US); Joel Brooks, Arlington, MA (US)

(73) Assignee: RightHand Robotics, Inc., Charlestown, MA (US)

( * ) Notice: Subject to any disclaimer, the term of this patent is extended or adjusted under 35 U.S.C. 154(b) by 419 days.

(21) Appl. No.: 17/430,888

(22) PCT Filed: Feb. 6, 2020

(86) PCT No.: PCT/US2020/016967
§ 371 (c)(1),
(2) Date: Aug. 13, 2021

(87) PCT Pub. No.: WO2020/185334
PCT Pub. Date: Sep. 17, 2020

(65) Prior Publication Data
US 2022/0032463 A1      Feb. 3, 2022

Related U.S. Application Data

(60) Provisional application No. 62/816,242, filed on Mar. 11, 2019.

(51) Int. Cl.
*B25J 9/16*     (2006.01)
*B25J 15/10*    (2006.01)
*B25J 19/02*    (2006.01)

(52) U.S. Cl.
CPC ........... *B25J 9/1669* (2013.01); *B25J 9/1697* (2013.01); *B25J 15/10* (2013.01); *B25J 19/021* (2013.01)

(58) Field of Classification Search
CPC ........ B25J 9/1669; B25J 9/1697; B25J 15/10; B25J 19/021
See application file for complete search history.

(56) References Cited

U.S. PATENT DOCUMENTS

2018/0243904 A1    8/2018   Bradski et al.
2020/0094997 A1*   3/2020   Menon .................. B25J 9/1697

FOREIGN PATENT DOCUMENTS

EP    0951968 A2     10/1999
EP    2331301 A1     6/2011
WO    2018017616 A1  1/2018

OTHER PUBLICATIONS

Extended European Search Report for European Application No. 20770320.8, PCT/US2020/016967, Nov. 28, 2022, 9 pages.

(Continued)

*Primary Examiner* — Jaime Figueroa
*Assistant Examiner* — Jamal A Shah
(74) *Attorney, Agent, or Firm* — Danielson Legal LLC (57) ABSTRACT

Robotic picking devices and methods for performing a picking operation. The methods described herein may involve determining that a picking device is unable to grasp an item and then performing, using a perturbation mechanism, a perturbation operation to perturb the item so that the picking device is more likely to grasp the item by executing a subsequent grasp attempt.

19 Claims, 7 Drawing Sheets

(56) References Cited

OTHER PUBLICATIONS

Deng, Yuhong, et al. Deep Reinforcement Learning for Robotic Pushing and Picking in Cluttered Environment, 2019 IEEE/RSJ International Conference on Intelligent Robots and Systems (IROS), pp. 619-626, 2019.
International Search Report for PCT/US2020/016967, May 27, 2020, 2 pages.
Written Opinion for PCT/US2020/016967, May 27, 2020, 4 pages.

\* cited by examiner

ITEM PERTURBATION FOR PICKING OPERATIONS

CROSS-REFERENCE TO RELATED APPLICATIONS

The present application is the national phase of International (PCT) Patent Application No. PCT/US2020/016967, filed internationally on Feb. 6, 2020, and claims the benefit of and priority to U.S. provisional application No. 62/816,242, filed on Mar. 11, 2019, the entire disclosure of which is incorporated by reference as if set forth in its entirety herein.

TECHNICAL FIELD

Embodiments described herein generally relate to robotic devices and methods and, more particularly but not exclusively, to robotic devices and methods for performing picking operations.

BACKGROUND

Logistic operations such as those in warehouse environments often include robotic picking devices to gather items from a first location (e.g., a container) and place the items at a second location (e.g., on a conveyor belt).

Accordingly, these operations require the robotic picking device to first successfully grasp the item. Oftentimes, however, the item to be grasped is in a position, configuration, location, or orientation such that the picking device is unable to grasp the item in accordance with the picking operation. For example, the item may be blocked by other items, wedged against a wall, tipped on its side, or the like.

Existing techniques for ensuring that a picking device can grasp an item generally focus on improving the picking device's hardware and/or software to prevent situations in which the picking device cannot grasp an item. Even with these hardware or software improvements, however, there is no guarantee the picking device will be able to grasp an item when required. Additionally, there is generally no "backup" plan in the event of a grasp failure. Rather, these techniques will generally require a human to intervene if a picking device cannot grasp an item.

A need exists, therefore, for systems and methods for performing picking operations that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for performing a picking operation. The method includes determining, using a processor executing instructions stored on memory, that a picking device is unable to grasp an item; and performing, using a perturbation mechanism, a perturbation operation to perturb the item so that the picking device is more likely to grasp the item by executing a subsequent grasp attempt.

In some embodiments, the processor determines that the picking device is unable to grasp the item by analyzing a result of a previous grasp attempt.

In some embodiments, the method further includes receiving at an interface imagery regarding the item to be grasped, wherein the processor determines that the picking device is unable to grasp the item by analyzing the received imagery.

In some embodiments, the perturbation mechanism is the picking device, and the method further includes executing the grasp attempt using the picking device after the picking device performs the perturbation operation. In some embodiments, the method further includes determining whether the picking device grasped the item by executing the grasp attempt, performing a second perturbation operation upon determining the picking device did not grasp the item, and executing a second grasp attempt using the picking device.

In some embodiments, performing the perturbation operation involves perturbing a container that holds the item.

In some embodiments, performing the perturbation operation involves at least one of rotating the item, translating the item, reorienting the item, and reconfiguring the item.

In some embodiments, the picking device includes a suction device to grasp the item, and performing the perturbation operation includes moving the item to facilitate the suction device obtaining a grasp on a surface of the item.

In some embodiments, the picking device includes a plurality of finger portions, and performing the perturbation operation includes moving the item so that the plurality of finger portions can grasp the item.

According to another aspect, embodiments relate to a system for performing a picking operation. The system includes a processor executing instructions stored on memory to determine that a picking device is unable to grasp an item and a perturbation mechanism configured to perform a perturbation operation to perturb the item so that the picking device is more likely to grasp the item by executing a subsequent grasp attempt.

In some embodiments, the processor determines that the picking device is unable to grasp the item by analyzing a result of a previous grasp attempt.

In some embodiments, the system further includes an interface for receiving imagery regarding the item to be grasped, wherein the processor determines that the picking device is unable to grasp the item by analyzing the received imagery.

In some embodiments, the perturbation mechanism is the picking device, and the picking device executes the grasp attempt after performing the perturbation operation. In some embodiments, the processor is further configured to determine whether the picking device grasped the item by executing the grasp attempt, and the picking device is further configured to perform a second perturbation operation upon determining the picking device did not grasp the item and perform a second grasp attempt.

In some embodiments, the perturbation mechanism performs the perturbation operation by perturbing a container that holds the item.

In some embodiments, the perturbation mechanism performs the perturbation operation by performing at least one of rotating the item, translating the item, reorienting the item, and reconfiguring the item.

In some embodiments, the picking device includes a suction device to grasp the item, and the perturbation operation involves the perturbation mechanism moving the item to facilitate the suction device obtaining a grasp on a surface of the item.

In some embodiments, the picking device includes a plurality of finger portions, and performing the perturbation operation involves moving the item so that the plurality of finger portions can grasp the item.

According to yet another aspect, embodiments relate to a method for performing a picking operation. The method includes determining, using a processor executing instructions stored on memory, whether a picking device is able to grasp a first item from a plurality of items; upon determining that the picking device is unable to grasp the first item, determining whether the picking device is able to grasp a second item from the plurality of items; and executing, using the picking device, a grasp attempt to grasp the second item upon determining the picking device is able to grasp the second item from the plurality of items.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Picking operations generally involve a robotic picking device executing a grasp attempt to grasp an item (e.g., from a shelf, container, bin, or the like), and then placing the item at another location. The "place" location may be another container, bin, conveyor belt, or the like. The types of pick and place locations may vary and may depend on the application or the environment in which the picking operation is to be performed.

As discussed previously, items that are the subject of picking operations are frequently in positions, orientations, configurations, or locations such that a robotic picking device is unable to grasp the item(s) of interest. Similarly, there may be other items blocking or otherwise obstructing the picking device's access to the item. The robotic picking device would therefore be unable to perform the picking operation in these scenarios.

In these situations, a human operator may need to intervene to adjust the item, move another item so that a robotic picking device can access the item of interest, or may even need to perform the picking operation themselves. This inevitably contributes to down time and consumes resources as a human operator is required to intervene.

The embodiments described herein provide novel systems and methods for performing a picking operation. The systems and methods described herein may first determine whether a robotic picking device (for simplicity, "picking device") is able to grasp an item in accordance with a picking operation.

The systems and methods described herein may determine whether the picking device is able to grasp the item in a number of ways. In some embodiments, the systems and methods may receive and analyze imagery regarding item(s) to be grasped. This imagery may provide insight regarding the item's orientation, location, configuration, whether any other items are blocking the desired item, as well as any other information that may indicate whether the picking device can grasp the item.

As another example, the systems and methods described herein may determine whether the picking device is able to grasp the item by analyzing the result of a previous grasp attempt. If the picking device had previously executed a grasp attempt, but did not grasp the item, the systems and methods described herein may determine that the picking device is unable to grasp the item.

Upon determining that the picking device is unable to grasp an item, a perturbation mechanism may perform one or more perturbation operations to perturb the item so that the picking device is at least more likely to grasp the item by executing a subsequent grasp attempt.

In some embodiments, the picking device may be the perturbation mechanism and perform the perturbation operation. In some embodiments, the perturbation mechanism and the picking device may be separate devices.

The perturbation operation may involve the perturbation mechanism "stirring" items in a bin or a container to change the position or orientation of the desired item so that it can be more easily grasped. Specifically, the perturbation operation may involve the perturbation mechanism "reaching" into a bin, container, or shelf that contains the item(s) of interest, and then performing one or more of a sweeping motion, a dragging motion, a pinching motion, or the like. As another example, the perturbation mechanism may grab a container holding the item(s) and shake the container to agitate the contents thereof.

After the perturbation mechanism performs the perturbation operation, the picking device may execute a grasp attempt to grasp the item. The perturbation operation would hopefully have remedied any issues with the item's orientation or location such that the picking device can now grasp the item. Once the picking device grasps the item, the picking device can then perform the remainder of the picking operation (e.g., placing the item at a desired place location).

In some instances the picking device may still not be able to grasp the item, even after the perturbation mechanism performs the perturbation operation. Accordingly, the perturbation mechanism may perform subsequent perturbation operations and the picking device may perform subsequent grasp attempts until the picking device successfully grasps the item.

Figure 1:
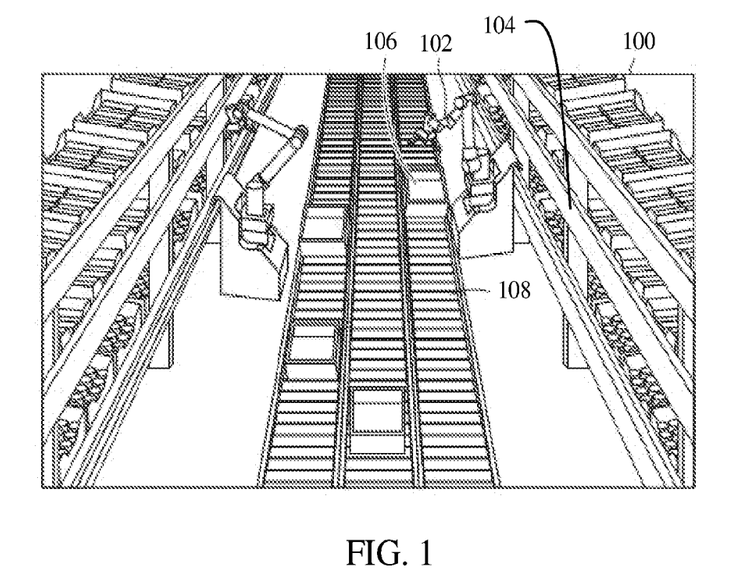
FIG. 1 illustrates a picking device in a warehouse environment in accordance with one embodiment.

The devices and methods described herein may be implemented in a number of environments and for a number of applications. FIG. 1 illustrates a warehouse environment 100 in which one or more picking devices 102 may be tasked with performing pick-and-place operations. For example, the gripping device 102 may comprise an arm portion (e.g., formed of a plurality of arm segments or links) and an end effector and may be tasked with picking an item from a shelving unit 104 and placing the item in a container 106. The container 106 may be on conveyor belt 108 configured to move the container 106 to and from the gripping device 102. Additionally or alternatively, the picking device 102 may be tasked with picking items from the container 106 and placing the items in a shelving unit 104, put wall, storage location, another bin or container, or the like.

Figure 2:
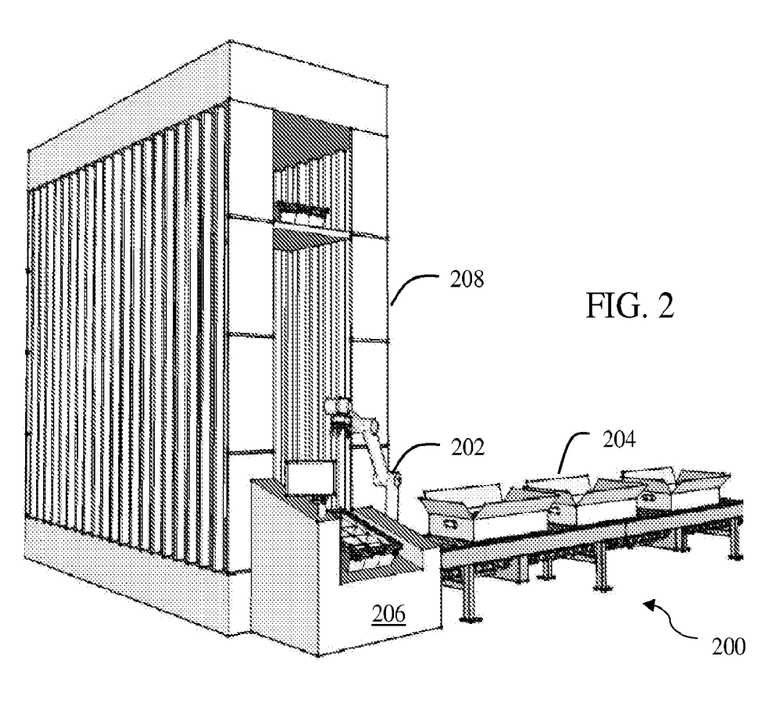
FIG. 2 illustrates a picking device in a warehouse environment in accordance with another embodiment.
Figure 3:
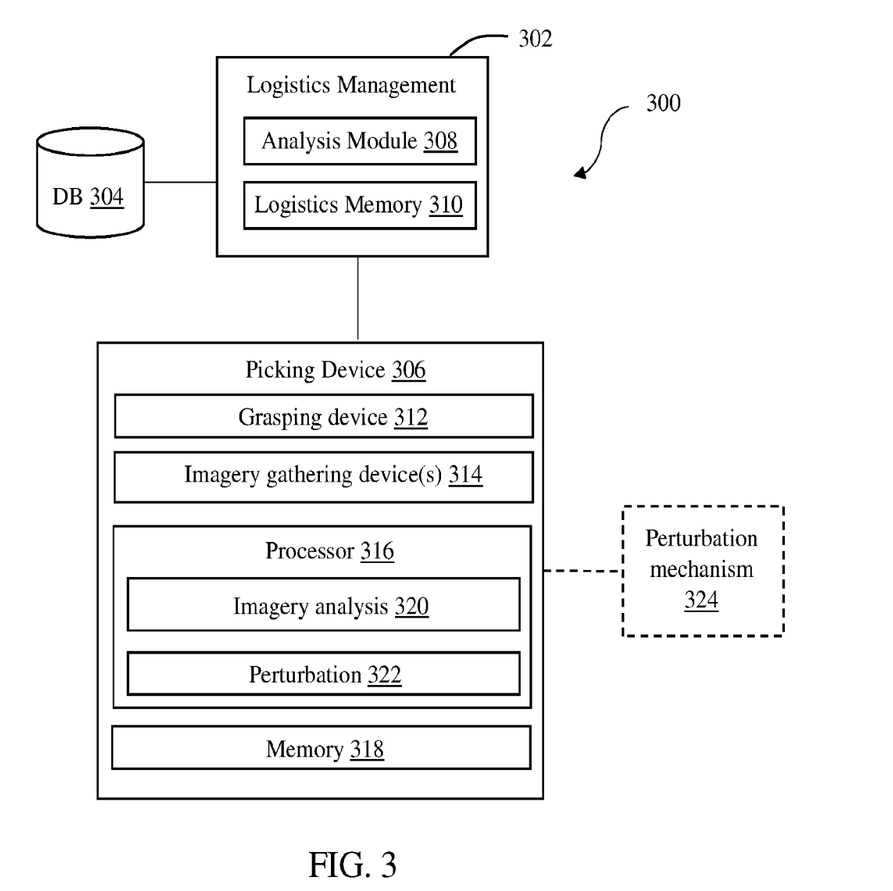
FIG. 3 illustrates a system for performing a picking operation in accordance with one embodiment.

FIG. 2 illustrates another exemplary application in a warehouse environment 200 in which a picking device 202 may be tasked with picking items from one or more containers 204, and placing the items at a loading station 206. These items may then be placed in a shipping container 208 for further shipment, sorting, processing, or the like FIG. 3 illustrates a system 300 for performing a picking operation in accordance with one embodiment. The system 300 may include a logistics management module 302, one or more databases 304, and a picking device 306.

The logistics management module 302 may be a processing device and may include or otherwise execute an analysis module 308 and instructions stored on logistics memory 310. The logistics management module 302 may be in operable communication with the database(s) 304. The database(s) 304 may store data regarding, for example, items commonly grasped, results of previous pick attempts and picking operations, picking strategies, or the like.

The analysis module 308 may execute instructions stored in logistics memory 310 to perform any required analysis (e.g., if not performed by the picking device). These analyses may involve analyzing received imagery to determine whether the picking device 306 can grasp an item, determining whether the picking device 306 has grasped an item, or the like.

One or more networks may link the various assets and components 302-06. The network(s) may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The picking device 306 may be tasked with performing one or more picking operations. As discussed previously, picking operations generally involve a picking device picking an item from a first location and placing the item at a second location. In accordance with the embodiments described herein, the picking device 306 may include at least one grasping device 312 for grasping an item in accordance with a picking operation.

The grasping device 312 may be configured in a variety of ways, which may depend on the item(s) to be picked. In some embodiments, the grasping device 312 may be configured as an end effector with a plurality of finger portions.

In these embodiments, the picking device 306 may grasp an item by positioning the end effector near the item so that the finger portions are on opposite sides of the item, and then closing the finger portions so that they come into contact with the item. If the finger portion(s) apply a sufficient amount of force to the item, they can then pick up and move the item to another location in accordance with the requirements of a picking operation.

In other embodiments, the grasping device 312 may be configured as one or more suction devices that generate a suction force to obtain a grasp on an item. In these embodiments, the grasping device 312 may further include any required vacuum generators and tubing to provide the required suction force.

In operation, the picking device 306 may move the suction device(s) close enough to the item or otherwise to be in contact with the item such that the generated suction force causes the item to stay in contact with the suction device. Once grasped, the suction device may move the item to the desired location. The suction force may be stopped so that the suction device(s) releases the item at the desired location.

The picking device may further include, be configured with, or otherwise be in communication with imagery gathering devices 314. These imagery gathering devices 314 may be directed towards item(s) to be picked and may gather imagery regarding an item such as the item's orientation, configuration, location, or other type of information that may affect whether the picking device 306 can grasp the item.

These imagery gathering devices 314 may include, for example and without limitation, any one or more of RGB cameras, stereoscopic cameras, LIDAR, sonar sensors, etc.

The exact type or configuration of the imagery gathering devices 314 used may vary and may include any type of sensor device whether available now or invented hereafter as long as they can gather data required to accomplish the objectives of the embodiments herein.

The location or placement of the imagery gathering devices 314 may vary as well, and may depend on the type of imagery gathering devices 314 used. For example, if the grasping device 312 is configured as an end effector with finger portions, one or more imagery gathering devices 314 may be embedded in the palm of the end effector.

The processor 316 may execute instructions stored on memory 318 to determine whether the picking device 306 is able to grasp an item. Specifically, the imagery analysis module 320 may execute one or more imagery analysis tools to determine whether the picking device 306 can grasp the item.

The memory 318 may be L1, L2, or L3 cache or RAM memory configurations. The memory 318 may include non-volatile memory such as flash memory, EPROM, EEPROM, ROM, and PROM, or volatile memory such as static or dynamic RAM, as discussed above. The exact configuration and type of memory 318 may of course vary as long as instructions for performing the steps of the claimed embodiments can be executed by the processor 316.

For example, the imagery analysis module 320 may analyze received imagery to determine the size of a desired item. This information, in conjunction with knowledge of the size of finger portions (and their opening range) may help determine whether the finger portions can grasp the item. For example, if the item to be grasped has a width of one inch, and the finger portions have a grasping range (i.e., the distance between two finger portions when spread apart) of three inches, then the grasping device 312 should be able to grasp the item.

Similarly, the imagery analysis module 320 may determine if there is a sufficient amount of space on both sides of the item such that the finger portions can reach around the item. Knowledge regarding the grasping device 312 such as the size of the finger portions may be stored in the one or more databases 304.

In other embodiments, the grasping device 312 may comprise one or more suction devices. If the grasping device 312 comprises one or more suction devices, the imagery analysis module 320 may detect whether or not the item has a flat surface large enough to be grasped by one or more suction devices.

These determinations may therefore be reliant on knowledge regarding abilities, sizes, and/or configurations of the grasping device 312. If the grasping device 312 is configured as an end effector with finger portions, this knowledge may relate to how many finger portions are included, the positions of the finger portions on the end effector with respect to other finger portions, the size of the finger portions (e.g., their length, width), compliance, material, bend point(s), range of motion, or any other type of information that may affect whether the picking device is able to grasp the item. If the grasping device 312 is configured with a suction device, this information may include the number of suction devices, the size of the suction device(s), the force generated, or any other type of information that may affect whether the picking device is able to grasp an item.

Similarly, knowledge regarding the items may be considered as well. For example, the database(s) 304 may store data regarding an item's weight, shape, length, width, depth, contents, surface coefficient of friction, configuration (e.g., whether the item has any specific locations ideal for grasping), deformability, or any other type of data or characteristics that may affect whether the picking device is able to grasp the item.

If the imagery analysis module 320 determines that the picking device 306 is able to grasp the item, the picking device 306 may then execute a grasp attempt. The exact motions or movements of the grasping device 312 may vary and may depend on the type or configurations of the grasping device 312 and/or the item.

If the grasping attempt is successful, the picking device 306 may then complete the picking operation. That is, the picking device 306 may move the item to a "place" location and release the item. For example, the finger portions may "open" to release the item. Or, a vacuum generator may cease a vacuum force to release the item. The picking device 306 may then proceed to perform subsequent picking operations on any remaining items.

On the other hand, the imagery analysis module 320 may determine that the picking device 306 is unable to grasp the item. This may be due to any number of reasons, such as if the item is blocked by other items or otherwise if the item is in a location that cannot be accessed by the grasping device 312. In this case, the perturbation module 322 may execute instructions stored in memory 318 to develop a perturbation operation strategy executable by the picking device 306 or some external perturbation mechanism 324.

The perturbation operation should make it at least more likely that the picking device 306 (i.e., the grasping device 312) is able to grasp the item. There may be several different types of perturbation operations that may be performed in accordance with the embodiments described herein.

Figure 4:
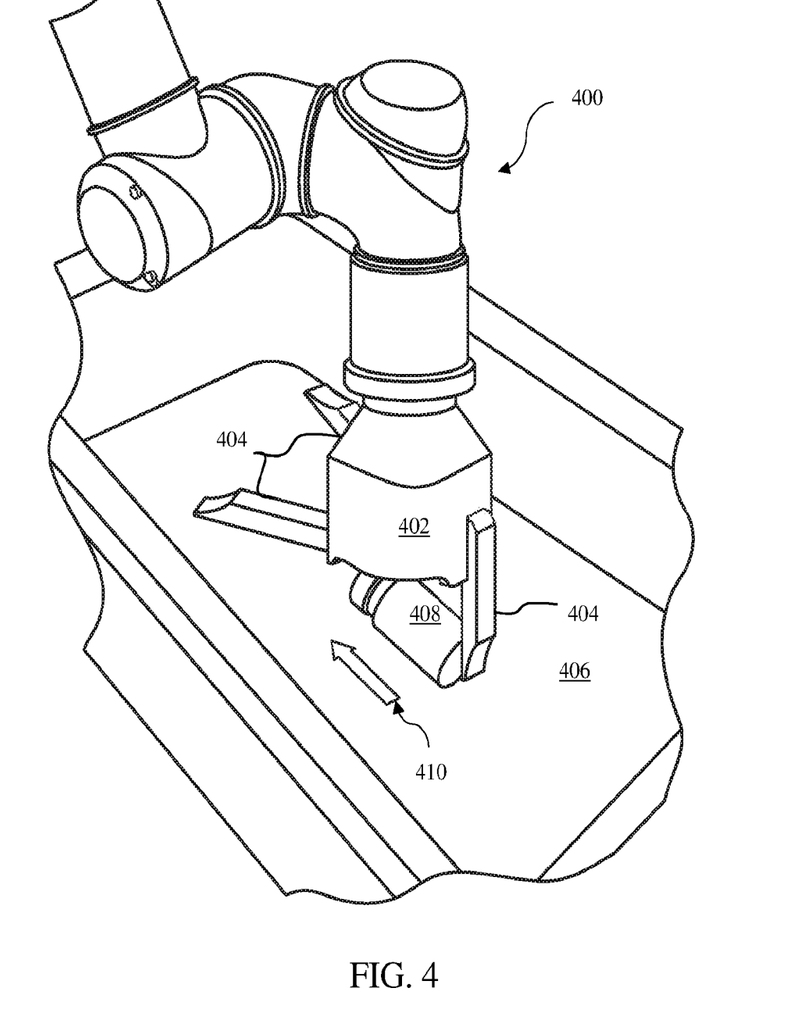
FIG. 4 illustrates a picking device performing a perturbation operation in accordance with one embodiment.

FIG. 4 illustrates a picking device 400 performing a perturbation operation in accordance with one embodiment. As seen FIG. 4, the picking device 400 may include an end effector 402 with a plurality of finger portions 404. The picking device 400 is shown "reaching" into a container or bin 406 that may include one or more items 408.

In the embodiment shown in FIG. 4, an imagery analysis module such as the imagery analysis module 320 of FIG. 3 may have determined from received imagery that the finger portions 404 would be unable to grasp the item 408. Accordingly, the picking device 400 may perform a perturbation operation to, for example, contact and move the item 408 (as well as any other items in the bin 406) to another configuration, location, position, or the like.

FIG. 4 in particular illustrates the picking device 400 performing a "drag" perturbation operation in which one or more finger portions 404 contact the item 408 and perform a "dragging" motion as indicated by directional arrow 410. At the end of the motion, the dragging finger portion(s) 404 may be hinged downward in a "flicking" motion to further perturb any items encountered along their path.

The picking device 400 may perform this type of dragging motion multiple times to increase the chances of contacting the item 408 and improving the orientation, location, and/or configuration of the item 408. After performing one or more of these operations, the picking device 400 may determine whether it can now grasp the item. The picking device 400 may then execute a grasp attempt. In some embodiments, the picking device may execute a grasp attempt after performing a perturbation operation. In other embodiments, the picking device may not execute a grasp attempt until the picking device determines that it is able to grasp the item.

Figure 5A:
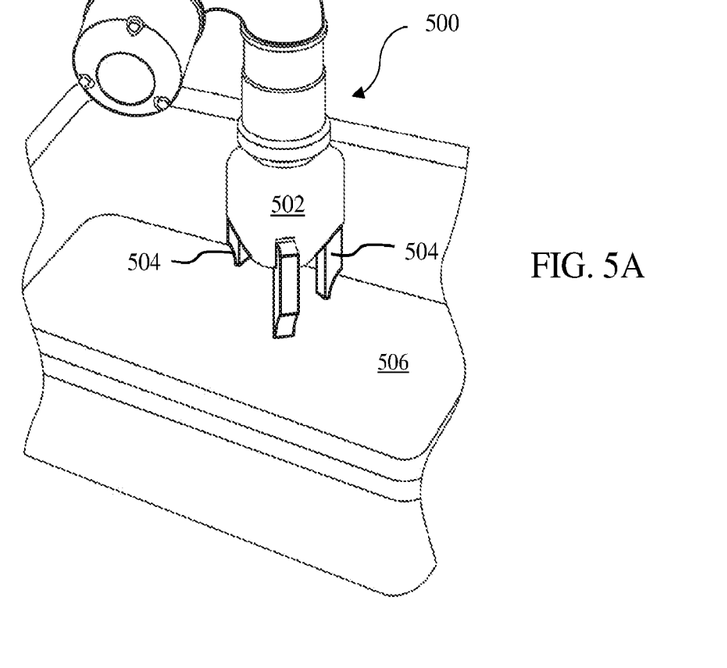
FIGS. 5A & B illustrate a picking device performing a perturbation operation in accordance with another embodiment.
Figure 5B:
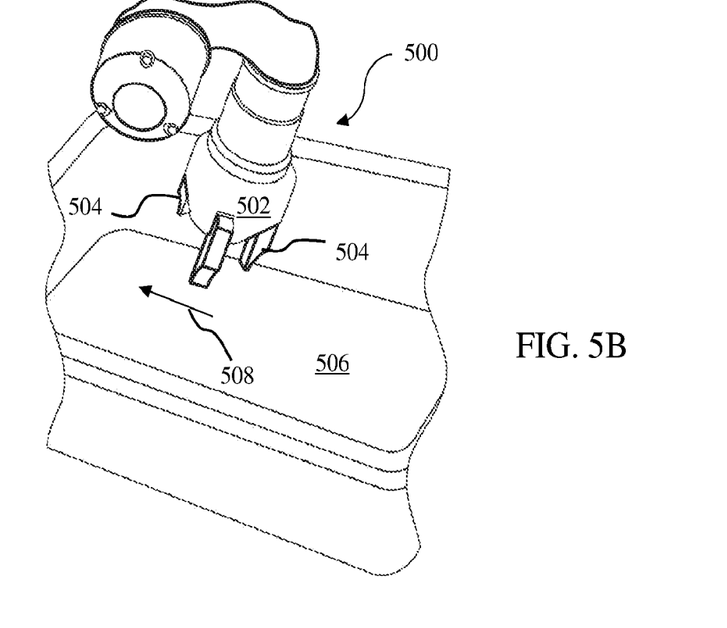

FIGS. 5A & B illustrate a picking device 500 performing a perturbation operation in accordance with another embodiment. Similar to the picking device 400 of FIG. 4, the picking device 500 includes an end effector 502 with a plurality of finger portions 504, and is illustrated reaching into a container or bin 506.

As seen in FIGS. 5A & B, the picking device 500 is performing a "sweep" perturbation operation in which the picking device 500 places the end effector 502 in the corner of the bin 506 with the finger portions 504 pointed towards and touching the bottom of the bin 506. The end effector 502 then moves in a motion that is parallel to a wall of the bin 506 until it reaches the corner at the opposite end of the wall. This motion is generally indicated by directional arrow 508 in FIG. 5B. This motion may cause the finger portions 504 to contact any items in the bin 506

Figure 6:
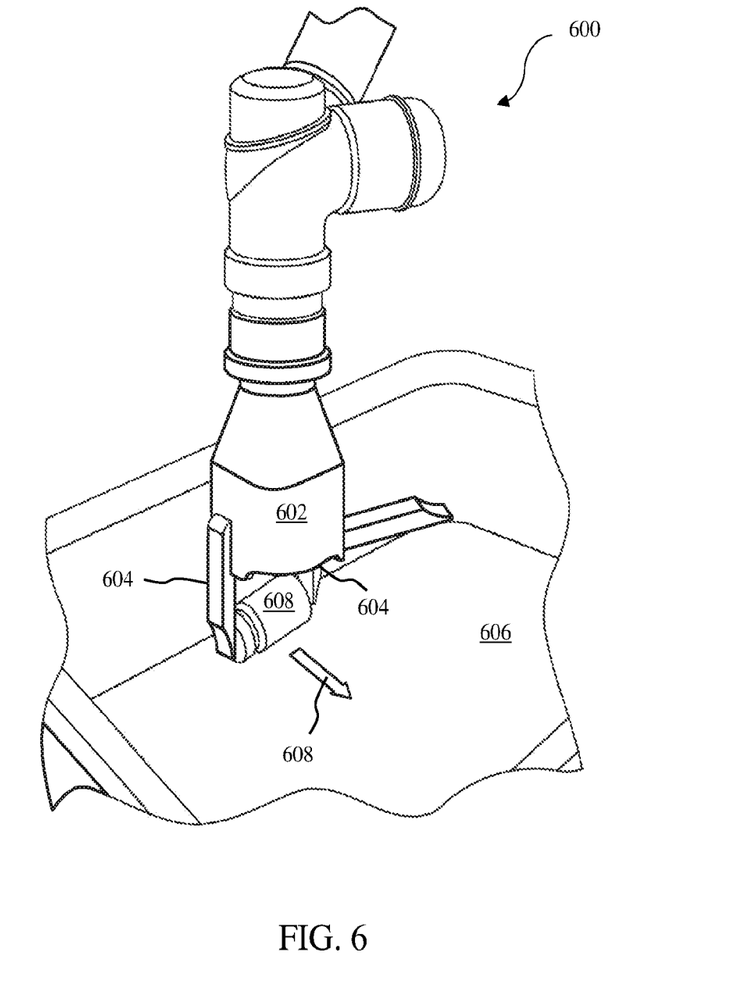
FIG. 6 illustrates a picking device performing a perturbation operation in accordance with yet another embodiment.

FIG. 6 illustrates a picking device 600 performing a perturbation operation in accordance with yet another embodiment. Similar to the picking devices 400 and 500, the picking device 600 of FIG. 6 includes an end effector 602 with a plurality of finger portions 604 reaching into a container or bin 606. The perturbation operation of FIG. 6 may be referred to as a "pinch" operation, and may involve the picking device 600 closing the finger portions 604 in a pinching motion along the wall of the bin 606. After the pinching motion, the end effector 602 may move in a motion perpendicular to the wall of the bin 606 along which it was pinching, as indicated by directional arrow 608. During the pinching operation, and as seen in FIG. 6, the picking device 600 may in fact contact an item 610 (or even pinch the item 610 such that it grasps the item). At the very least, the contact may move the item 610 in such a way that the picking device 600 is more likely able to grasp the item.

The situation in which a picking device is unable to grasp an item may unfold in two ways. In a first scenario, the picking device attempts to grab an item but is unsuccessful. For example, the picking device may attempt to place a suction cup on the item but is unable to gain sufficient suction to successfully pick up the item.

In a second scenario, the picking software may be unable to compute a configuration to grasp a particular item. For example, the software may be unable to find a suitably large enough location on the item on which the picking device can place a suction cup.

In either of these cases, the perturbation operation may attempt to move the item in a manner that will allow the item to be picked up on subsequent attempts. If the item is close to a wall, the picking device may utilize the pinch strategy to move the item away from the wall. Otherwise, the drag strategy may be used. After the chosen strategy has been executed, the item will hopefully be translated or rotated in a manner such that the picking device is able to grasp the item on subsequent attempts. In some embodiments, multiple perturbations may be needed on a single item before a successful grasp.

In other situations, there may be items in an unpickable state but the picking device is unable to make a drag or pinch motion specific to any one of these items. This could be due to the software being unable to compute a viable manner in which to attempt these perturbations. This could also be a result of the vision software failing to identify any items held within the bin.

In these scenarios, the picking device may execute strategies that perturb the items inside the bin generally, and not any specific item therein. For example, the picking device may use the sweep strategy to perturb any items near the bin walls. The picking device may additionally or alternatively use the drag strategy to blindly attempt to perturb any items stuck in corners of the bin. The picking device may exhaustively try a sweep motion along every bin wall and/or a drag motion in every bin corner until it is able to grasp or perturb a specific item.

Figure 7:
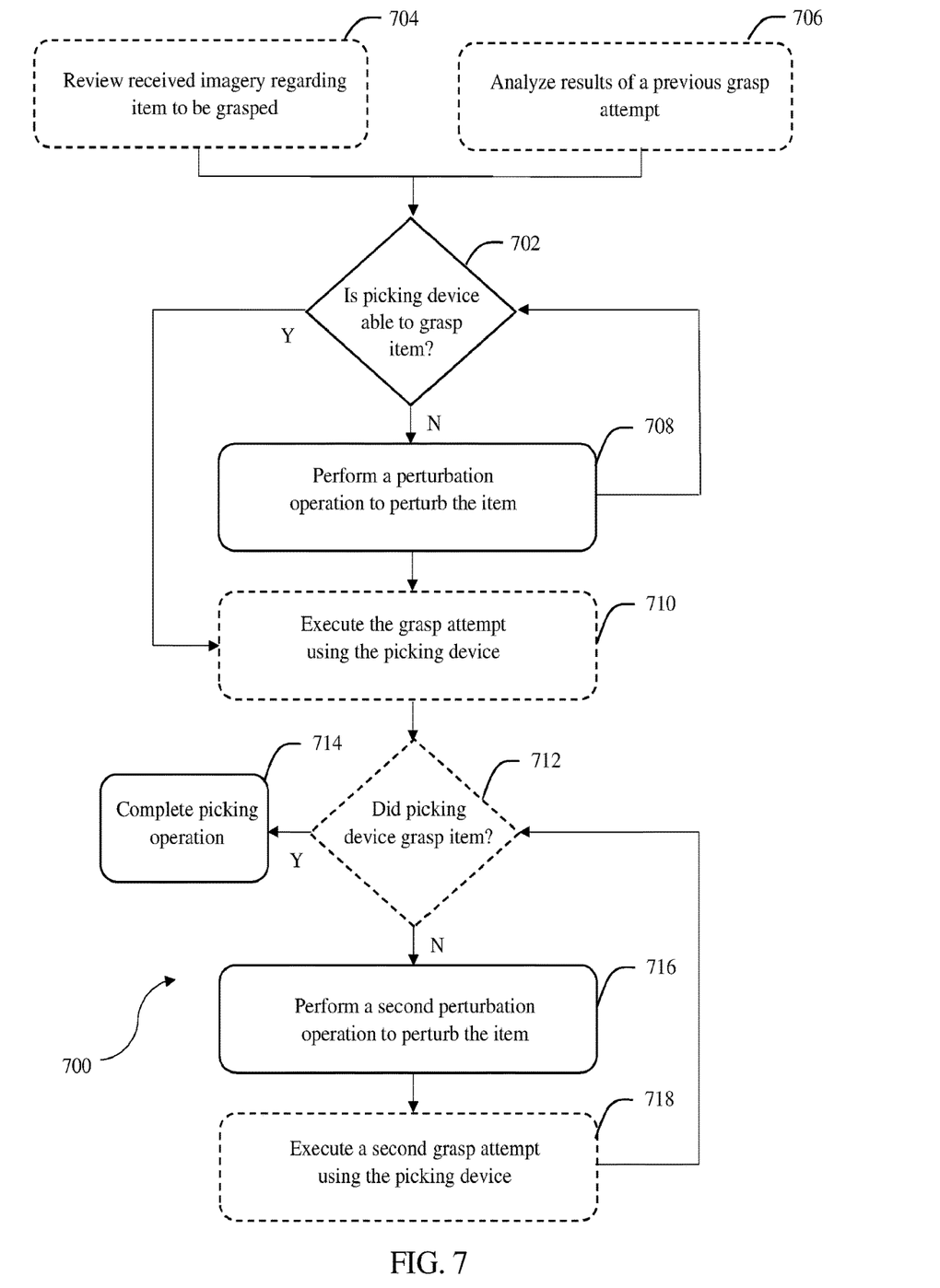
FIG. 7 depicts a flowchart of a method for performing a picking operation in accordance with one embodiment.

These item-agnostic perturbation strategies can be utilized by the picking device regardless of whether the device detects any items in the bin. By trying multiple sweeps and drags before, the picking device can physically ensure the bin is empty FIG. 7 depicts a flowchart of a method 700 for performing a picking operation in accordance with one embodiment. Step 702 involves determining whether a picking device is able to grasp an item. This determination may be made based on a variety of information.

For example, this determination may be made by reviewing received imagery regarding the item to be grasped in optional step 704. This imagery may indicate the orientation of the item to be grasped, the configuration of the item to be grasped, the location of the item to grasped, or any other type of data that may at least suggest whether the picking device is able to grasp the item.

This imagery may be gathered by sensor devices such as those discussed previously. These sensors may be configured with the picking device or otherwise operably positioned with respect to the picking device such that they can gather imagery regarding the item to be grasped.

Additionally or alternatively, this determination may be made by analyzing results of a previous grasp attempt in optional step 706. For example, the picking device may have already executed a grasp attempt. If it is detected that this grasp attempt failed (i.e., the picking device did not grasp the item), the determination in step 702 may be that the picking device is unable to grasp the item.

Step 702 may provide either a "yes" determination or a "no" determination. If the output is "no" (i.e., it is determined that the picking device is unable to grasp the item), the method 700 may proceed to step 708.

Step 708 involves performing a perturbation operation to perturb the item. This perturbation operation may include those described previously, and may make it at least more likely that the picking device is able to grasp the item. This perturbation operation may change the orientation of the item, the location of the item, the configuration of an item, the location of a container that contains the item, or the like.

The method 700 may proceed to step 710 after the perturbation operation of step 708. Step 710 involves executing the grasp attempt. As seen in FIG. 7, method 700 may proceed directly to this step after step 702 if it is determined that the picking device can grasp the item. That is, if step 702 determines that the picking device can grasp the item, method 700 may not need to perform the perturbation operation of step 708.

As seen in FIG. 7, method 700 may proceed back to step 702 after the perturbation step to determine whether the picking device can now grasp the item. Alternatively, the method 700 may proceed directly to step 710 to execute the grasp attempt.

The grasp attempt may involve the picking device approaching the item and performing some motion to contact the item. The type of motion or contact may vary and may depend on the configuration of the picking device.

If the picking device is configured with an end effector that includes a plurality of finger portions, the grasp attempt may involve moving the end effector close to the item such that the finger portions are positioned on opposite sides of the item, and then closing the finger portions to contact the item. If the picking device is configured with one or more suction devices, the grasp attempt may involve generating a suction force, and moving the suction device(s) to contact the item or to be in proximity with the item such that the suction force causes the item to contact and stay in contact with the suction device.

Step 712 involves determining whether the picking device grasped the item. This step may be performed using any one of suitable analysis techniques, such as those described in Applicant's co-pending application PCT Appl. No. PCT/US20/16078, filed on Jan. 31, 2020, the content of which is incorporated by reference as if set forth in its entirety herein.

If it is determined in step 712 that the picking device grasped the item, the method 700 may proceed to step 714. Step 714 involves completing the picking operation. As discussed previously, picking operations often involve a picking device grasping the item from a first location and moving the item to and releasing the item at a second location. Accordingly, if it is determined in step 712 that the picking device has grasped the item, the picking device may then place or otherwise release the item at a second location to complete the picking operation.

If it is determined in step 712 that the picking device did not grasp the item, the method 700 may proceed to step 716. Step 716 involves performing a second, or otherwise an additional, perturbation operation. In other words, if the grasping device failed, a perturbation operation may be performed again to make it at least more likely that the picking device will be able to grasp the item on a second (or otherwise subsequent) grasp attempt.

Step 718 involves executing a second grasp attempt using the picking device. Although this step recites a "second grasp attempt" this step may actually refer to any subsequent attempt. The method 700 may proceed back to step 712 to determine whether the picking device grasped the item. If yes, the method may proceed to step 714 to complete the picking operation. That is, steps of the method 700 may iterate multiple times until the grasping device grasps the item.

Figure 8:
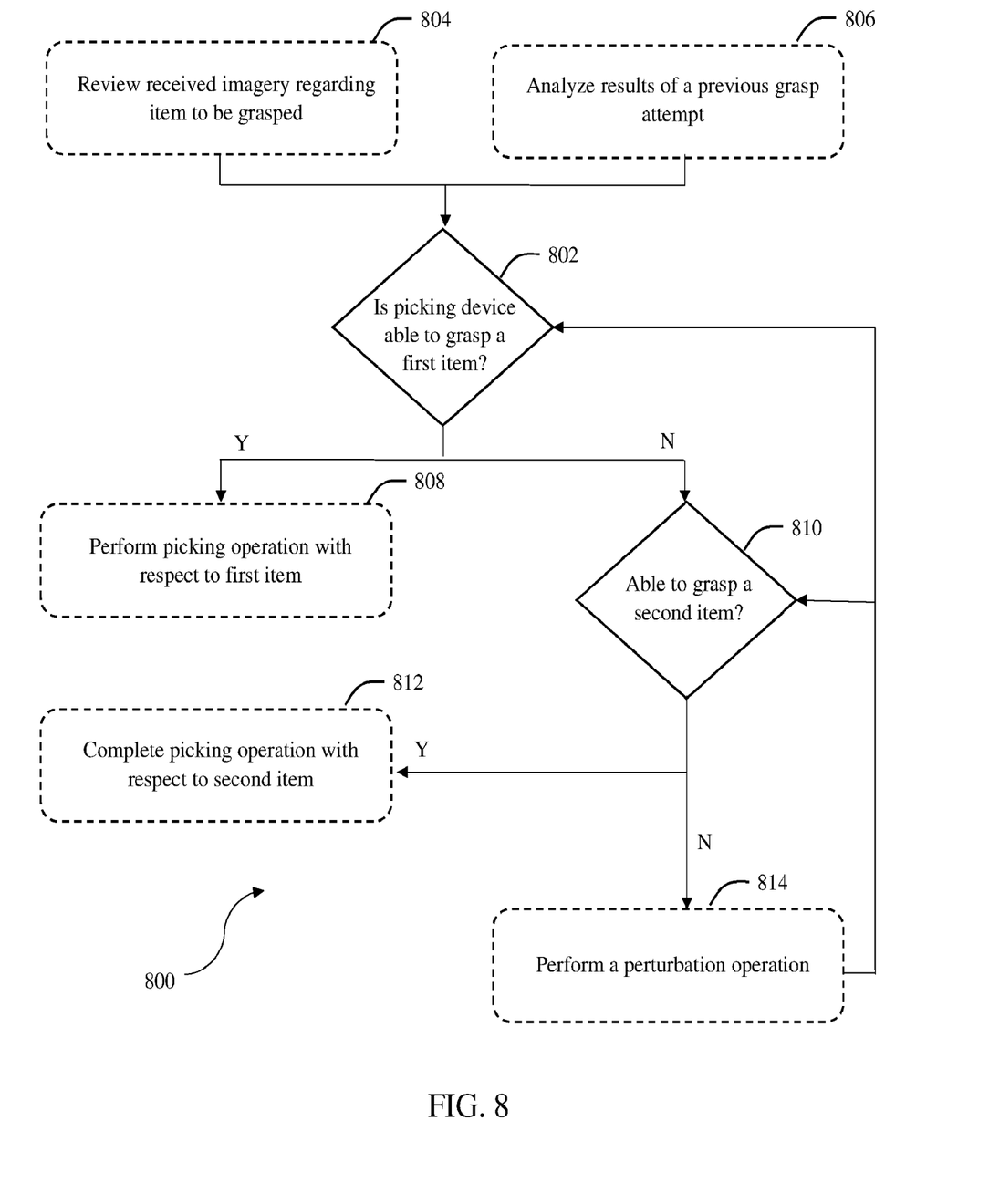
FIG. 8 depicts a flowchart of a method for performing a picking operation in accordance with another embodiment.

FIG. 8 depicts a flowchart of a method 800 for performing a picking operation in accordance with one embodiment. Step 802 involves determining whether a picking device is able to grasp a first item. Steps 802-06 are similar to steps 702-06 of FIG. 7, the discussions of which are not repeated here.

If it is determined at step 802 that the picking device is able to grasp the item, the method 800 may proceed to step 808. Step 808 involves performing a picking operation with respect to the first item. That is, if it is determined that the picking device can grasp the item, the picking device may then execute a grasp attempt to grasp the item. In accordance with the requirements of the picking operation, the picking device may then complete the picking operation by placing the first item at another location.

If it is determined at step 802 that the picking device is unable to grasp the first item, the method 800 may proceed to step 810. Step 810 involves determining whether the picking device is able to grasp a second item.

There may be multiple items that could be the subject of a picking operation. For example, a picking device may be tasked with picking and placing a plurality of items from a first location (e.g., a shelf) and placing them at a second location (e.g., a container). If at a given instant the picking device is unable to grasp a first one of the plurality of items, it may nonetheless be able to grasp a different, second item. Accordingly, it may not be worth performing a perturbation operation based on the picking device's inability to grasp the first item alone, as the picking device can continue performing a picking operation with respect to another item.

If it is determined at step 810 that the picking device is able to grasp a second item, the method may proceed to step 812. Step 812 involves completing the picking operation with respect to the second item. Accordingly, the picking device may grasp the second item and then place the item in an appropriate place location.

If it is determined at step 810 that the picking device is not able to grasp the second item, the method may proceed to step 814. Step 814 involves performing a perturbation operation such as those discussed previously.

After the perturbation operation is performed, the method 800 may proceed to either step 802 or step 810. That is, the method 800 may determine whether the picking device is able to grasp the first item and/or the second item as a result of the perturbation operation. Ideally the perturbation operation has made it possible that the picking device can then grasp at least one of the first and second items, at which point the picking device can then performing the picking operation thereon.

It is noted that, although not shown in FIG. 8, method 800 may also include the grasp-confirmation steps shown in FIG. 7. Although method 800 only determines whether two items can be grasped before performing a perturbation operation, the method 800 may involve determining whether any number of items can first be grasped before performing the perturbation operation.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for performing a picking operation, the method comprising:
   receiving at an interface imagery regarding thean item to be grasped;
   determining, using a processor executing instructions stored on memory, that a picking device is unable to grasp the item before the picking device performs a grasp attempt, wherein the processor determines that the picking device is unable to grasp the item by analyzing the received imagery; and
   performing, using a perturbation mechanism, a perturbation operation to perturb the item so that the picking device is more likely to grasp the item by executing a subsequent grasp attempt.

2. The method of claim 1 wherein the processor determines that the picking device is unable to grasp the item by analyzing a result of a previous grasp attempt.

3. The method of claim 1 wherein the perturbation mechanism is the picking device, and the method further includes executing the grasp attempt using the picking device after the picking device performs the perturbation operation.

4. The method of claim 3 further comprising:
   determining whether the picking device grasped the item by executing the grasp attempt,
   performing a second perturbation operation upon determining the picking device did not grasp the item, and
   executing a second grasp attempt using the picking device.

5. The method of claim 1 wherein performing the perturbation operation involves perturbing a container that holds the item.

6. The method of claim 1 wherein performing the perturbation operation involves at least one of rotating the item, translating the item, reorienting the item, and reconfiguring the item.

7. The method of claim 1 wherein the picking device includes a suction device to grasp the item, and performing the perturbation operation includes moving the item to facilitate the suction device obtaining a grasp on a surface of the item.

8. The method of claim 1 wherein the picking device includes a plurality of finger portions, and performing the perturbation operation includes moving the item so that the plurality of finger portions can grasp the item.

9. The method of claim 1 further comprising referencing a database to gather data regarding the item, wherein the data regarding the item includes one or more of weight, shape, length, width, depth contents, or deformability of the item, and the determination that the picking device is unable to grasp the item is further based on the data regarding the item.

10. The method of claim 1 further comprising referencing a database to gather data regarding the picking device, wherein the data regarding the picking device includes one or more of number of finger portions of the picking device, size of a finger portion of the picking device, compliance of the picking device, material of the picking device, size of a suction device of the picking device, or number of suction devices of the picking device.

11. A system for performing a picking operation, the system comprising:
an interface for receiving imagery regarding the item to be grasped;
a processor executing instructions stored on memory to determine that a picking device is unable to grasp an item before the picking device performs a grasp attempt, wherein the processor determines that the picking device is unable to grasp the item by analyzing the received imagery; and
a perturbation mechanism configured to perform a perturbation operation to perturb the item so that the picking device is more likely to grasp the item by executing a subsequent grasp attempt.

12. The system of claim 11 wherein the processor determines that the picking device is unable to grasp the item by analyzing a result of a previous grasp attempt.

13. The system of claim 11 wherein the perturbation mechanism is the picking device, and the picking device executes the grasp attempt after performing the perturbation operation.

14. The system of claim 13 wherein:
the processor is further configured to determine whether the picking device grasped the item by executing the grasp attempt, and
the picking device is further configured to:
perform a second perturbation operation upon determining the picking device did not grasp the item, and
perform a second grasp attempt.

15. The system of claim 11 wherein the perturbation mechanism performs the perturbation operation by perturbing a container that holds the item.

16. The system of claim 11 wherein the perturbation mechanism performs the perturbation operation by performing at least one of rotating the item, translating the item, reorienting the item, and reconfiguring the item.

17. The system of claim 11 wherein the picking device includes a suction device to grasp the item, and the perturbation operation involves the perturbation mechanism moving the item to facilitate the suction device obtaining a grasp on a surface of the item.

18. The system of claim 11 wherein the picking device includes a plurality of finger portions, and performing the perturbation operation involves moving the item so that the plurality of finger portions can grasp the item.

19. A method for performing a picking operation, the method comprising:
receiving imagery regarding a plurality of items including a first item and a second item;
determining, using a processor executing instructions stored on memory, whether a picking device is able to grasp the first item from a plurality of items before the picking device performs a grasp attempt based on the received imagery;
upon determining that the picking device is unable to grasp the first item, determining whether the picking device is able to grasp the second item from the plurality of items before the picking device performs a grasp attempt based on the received imagery; and
executing, using the picking device, a grasp attempt to grasp the second item upon determining the picking device is able to grasp the second item from the plurality of items.

* * * * *

UNITED STATES PATENT AND TRADEMARK OFFICE
CERTIFICATE OF CORRECTION

| | |
|---|---|
| PATENT NO. | : 12,115,677 B2 |
| APPLICATION NO. | : 17/430888 |
| DATED | : October 15, 2024 |
| INVENTOR(S) | : Franz Schneider and Joel Brooks |

It is certified that error appears in the above-identified patent and that said Letters Patent is hereby corrected as shown below:

In the Claims

In Column 14, Line 33, Claim 1, delete "thean" and replace it with --an--.

Signed and Sealed this
Twelfth Day of November, 2024

*Katherine Kelly Vidal*

Katherine Kelly Vidal
*Director of the United States Patent and Trademark Office*